Aug. 10, 1937.  F. W. COTTERMAN  2,089,640
PENDULUM VALVE
Filed July 8, 1933  2 Sheets-Sheet 1
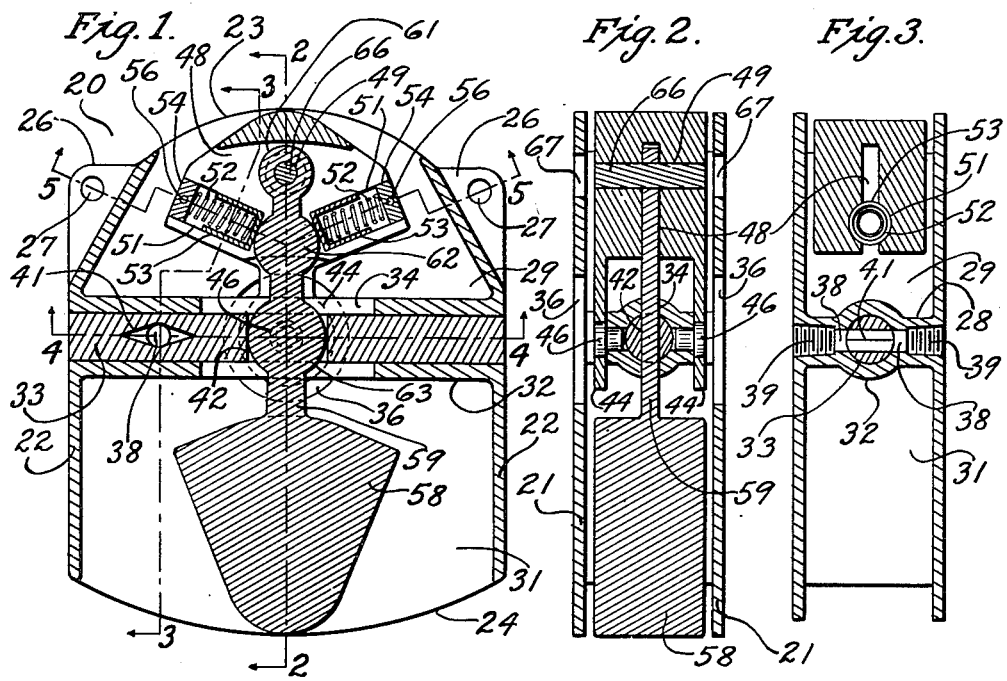
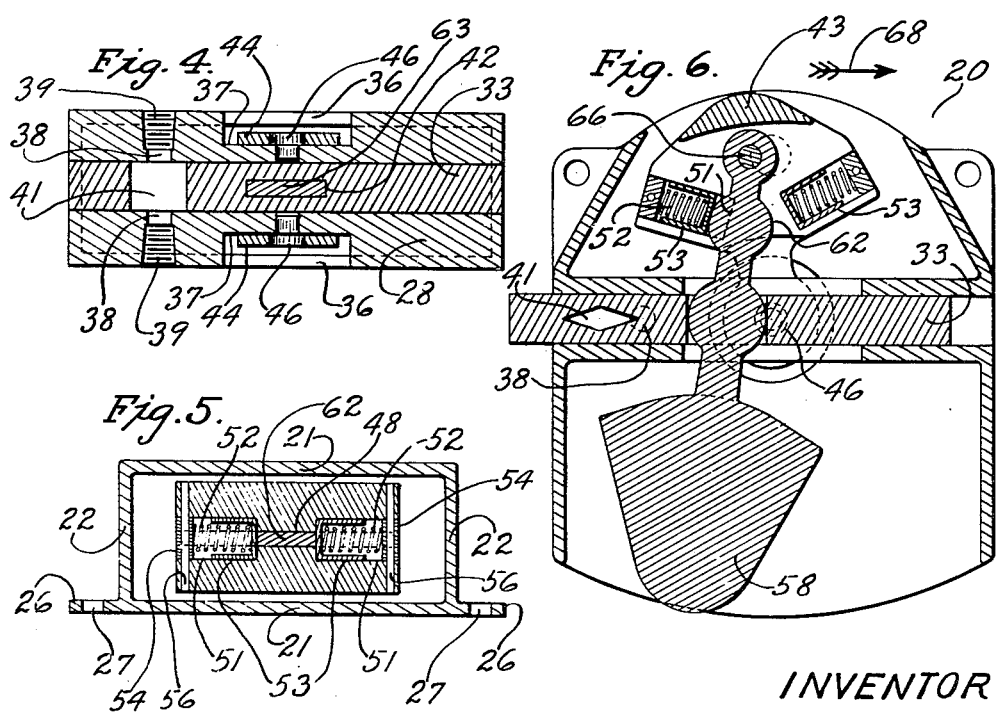
INVENTOR
Frederick W. Cotterman

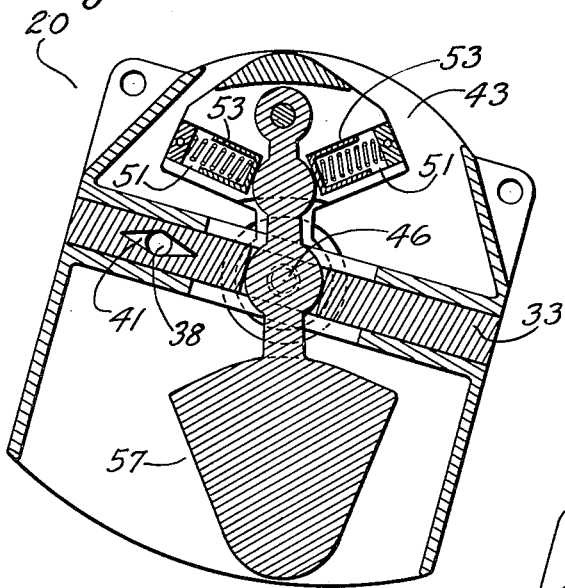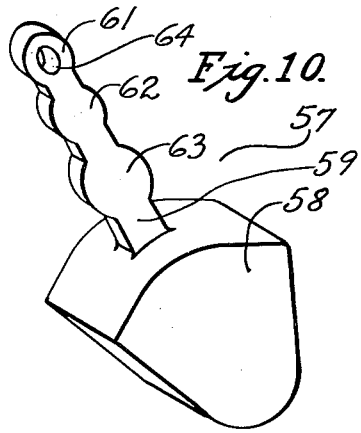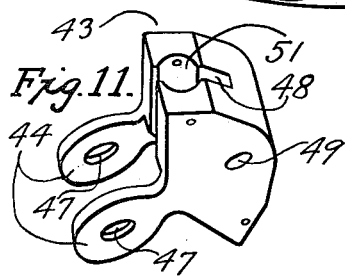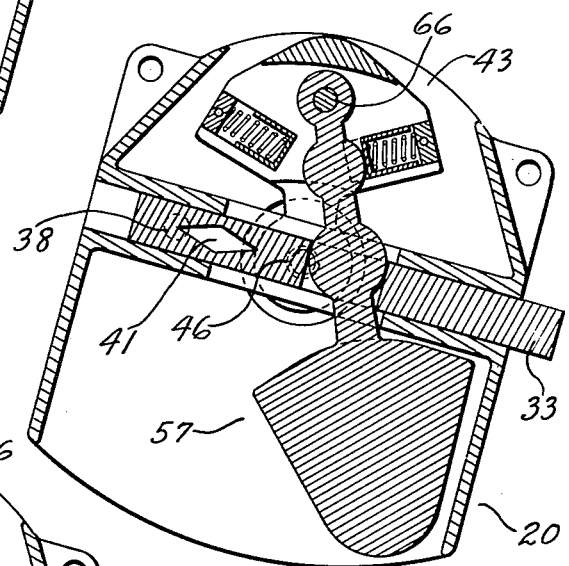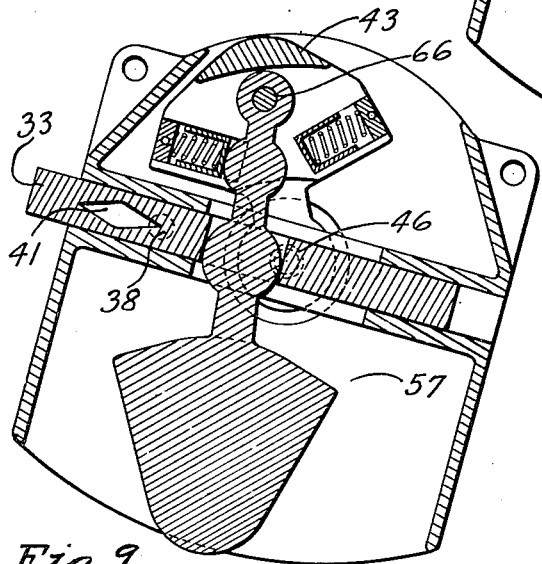

Patented Aug. 10, 1937

2,089,640

UNITED STATES PATENT OFFICE 2,089,640

PENDULUM VALVE

Frederick W. Cotterman, Dayton, Ohio, assignor of one-half to Bessie D. Apple, Dayton, Ohio Application July 8, 1933, Serial No. 679,553

18 Claims. (Cl. 137—139)

This invention relates to pendulum valves and particularly as applied to automotive vehicles.

An object of the invention is to provide such a valve suitable to be carried on a moving vehicle and which is responsive to acceleration or deceleration of the vehicle to alter the rate of flow of a fluid through the valve.

Pendulum valves are now in commercial use on motor vehicles in connection with air operated mechanism for disengaging the engine clutch, the valve being interposed in the air line. With such an arrangement a uniform clutch engagement is had even though the available air supply varies considerably, for, when the supply is great and the air operated mechanism proceeds to engage the clutch too rapidly, the acceleration thus produced operates on the valve to cut down the flow going to the mechanism and thereby causes slower engagement.

Pendulum valves as heretofore constructed for this purpose comprise a body which is secured to the vehicle, a pendulum which is hinged to the body and swings backwardly when the vehicle is accelerated and forwardly when it is decelerated, and a valve plunger which is shifted by the swinging of the pendulum to open or close suitable openings to thereby alter the capacity of the valve.

Now such a valve would perform exactly as desired if the vehicle always ran on level ground. But when the vehicle goes up or down a hill the pendulum remains vertical and the valve body assumes the angle of the vehicle to which it is fastened. The result is that the relation of the valve body to the pendulum is the same as it is when the valve body remains level and the pendulum swings. The effect of operating the vehicle at a uniform speed up or down a hill is the same on the valve as accelerating or decelerating the vehicle on a level road.

Thus it will be seen that a pendulum valve as now constructed and used for controlling air operated clutch engagement on a moving vehicle performs as intended when moving on a level road, that is, it does not change the valve capacity except when the vehicle is accelerated or decelerated. But it will also be seen that when operating the vehicle up or down a hill the valve capacity is changed even though the vehicle speed is perfectly uniform.

This last inherent feature in the valves now being used is undesirable, and it is therefore a further object of this invention to provide a valve which will not change its capacity due to an angular position taken by movement of the vehicle to which it is attached up or down a hill, but will only change its capacity when the vehicle is either accelerated or decelerated whether it is then traveling on a hill or on a level road.

That I attain these objects in the structure hereinafter described will become apparent when the description is read with reference to the drawings wherein—

Fig. 1 is a central vertical section through the valve.

Figs. 2, 3, 4 and 5 are sections taken through Fig. 1 at 2—2, 3—3, 4—4 and 5—5 respectively.

Fig. 6 shows the valve as it appears when its body is being carried along a horizontal plane and the rate of the movement is being altered.

Fig. 7 shows the valve as it appears when its body is being carried along an inclined plane and the rate of the movement remains uniform.

Fig. 8 shows the valve as it appears when moving up an inclined plane and acceleration is taking place, or as it appears when moving down an inclined plane and deceleration is taking place.

Fig. 9 shows the valve as it appears when moving up an inclined plane and deceleration is taking place, or as it appears when moving down an inclined plane and acceleration is taking place.

Figs. 10 and 11 are detail parts of the mechanism shown in perspective.

Similar numerals refer to similar parts throughout the several views.

The valve body 20 is a box like structure comprising side walls 21 and end walls 22 and open at top 23 and bottom 24. Ears 26 have holes 27 for mounting the body 20 on the vehicle on which it is to be used. Midway of the height is a partition 28 (see Fig. 3 or 4) separating the box into one upper compartment 29 and a lower compartment 31.

The partition 28 is thickened at the center to form a cylinder 32 within which a valve plunger 33 has sliding movement. A narrow slot 34 extends vertically through the cylinder 32. Openings 36 extend through the side walls 21 and enough farther to cut away a part of the partition 28, as at 37, Fig. 4. An air passage 38 extends through the body 20 and is pipe tapped at both ends as at 39. A diamond-shaped port 41 extends crosswise through the plunger 33.

When the valve is in its normal unoperated position the widest part of the diamond shaped port 41 is in line with the passage 38 of the valve body 20 as in Fig. 1.

In line with the slot 34 which extends vertically through the cylinder 32, is a similar slot 42 extending through the plunger 33. The slot 42 is as wide but not as long as the slot 34.

A hanger 43, shown in detail in Fig. 11, has two downwardly depending hinge ears 44 which straddle the partition 28 at the cut away portion 37. Hinge studs 46 fit tightly in holes in the partition 28 and freely in holes 47 (see Fig. 11) of the ears 44 whereby the hanger 43 has the movement of an inverted pendulum about the hinge studs 46.

The upper part of the hanger 43 is slotted as at 48, the slot 48 being of the same width as the slots 34 and 42. A hinge pin hole 49 passes crosswise through the hanger near the top. Spring holes 51 extend into the edges of the hanger and are of an exact depth (see Fig. 5). The springs 52 normally keep the spring thimbles 53 seated against the bottoms of the spring holes 51. Small plugs 54 held in by pins 56 close the outer ends of the spring holes 51.

The pendulum 57, shown in detail in Fig. 10, comprises the weight portion 58 with the upwardly extending stem 59. The stem 59 has three circular portions 61, 62 and 63. A hinge pin hole 64 extends through the top portion 61, and a hinge pin 66 extends through the hole 49 of the hanger and the hole 64 of the pendulum. The middle circular part 62 fits snugly against the bottoms of the spring thimbles 53 when they are seated against the bottoms of the holes 51, (see Fig. 5). The lower circular part 63 of the pendulum stem 59 fits slidably into the slot 42 of the valve plunger 33. Openings 67 in the side walls 21 are provided for convenience in entering the hinge pin 66 into the holes 49 and 64 of the hanger and the pendulum respectively.

The operation of the mechanism is as follows:

When a vehicle to which the improved valve herein shown is applied is at rest or is moving at a uniform speed along a level road the valve will appear as in Fig. 1. Inasmuch as the springs 52 keep the thimbles 53 seated against the bottoms of the holes 51 there is no room for movement of the circular part 62 of pendulum stem 59 relative to the hanger 43.

As long as there is no change in the rate of movement of the valve the pendulum 57, if it swings at all, will swing about the hinge studs 46, swinging the hanger 43 with it and maintaining the alignment shown, the weighted end 58 being heavier than the hanger 43, the line 2—2 Fig. 1 will remain vertical.

Now if the valve is moved in the direction of the arrow 68, Fig. 6, and its movement is suddenly accelerated, the weight of the hanger 43 will cause it to tip backward by turning on the hinge strip 46, and the weighted end 58 of the pendulum will also swing backward by swinging on the hinge pin 66, but while in Fig. 1 (see also Fig. 7), any swinging of the pendulum is about the hinge studs 46, which occasioned no movement of the valve plunger 33, the swinging in Fig. 6, being about the hinge pin 66 will shift the plunger 33 oppositely to the direction of the arrow 68, and thereby shift the diamond shaped port 41 so as to almost close the air passage 38.

When the relative positions shown in Fig. 6 are assumed, the rear thimble 53 is slightly raised from the bottom of the hole 51 by the circular part 62 of the pendulum against the pressure of the spring 52, while the forward thimble 53 remains seated on the bottom of the hole as before. As soon as the motion of the valve becomes uniform the parts will return to the positions shown in Fig. 1.

It will be apparent that if the valve is accelerated when moving oppositely to the arrow 68 the same effect will be had by the swinging of the pendulum to the opposite side of the vertical line. It will also be apparent that acceleration when moving in one direction will have the same effect on the valve as deceleration when moving in the other direction.

Now if a vehicle to which the improved valve is attached is moving up or down a sharp incline the valve body 20 will assume the position shown in Fig. 7, but as long as it moves at uniform speed up or down this incline the pendulum 57 together with the hanger 43 will swing about the hinge studs 46 and maintain their respective axes vertical and in alignment with each other and the plunger 33 will not move to alter the opening through the diamond shaped port 41 and passage 38, and neither of the thimbles 53 will be raised from the bottoms of the holes 51. From Fig. 7 it will be apparent that movement of a vehicle to which the valve body 20 is fastened up or down an incline will have no effect to open or close the valve.

If, while the body 20 is still held inclined as in Fig. 7 a change in the rate of its movement takes place, the valve will take one of the operated positions shown in Fig. 8 or 9. If the valve is being moved up an incline in the direction of the arrow 69 Fig. 8, and acceleration of its movement takes place, or if, from rest it is suddenly so moved, the hanger 43 will tip backward of the movement by rotation about the hinge studs 46 and the pendulum 57 will swing backward of the movement by swinging about the hinge pin 66 whereby the plunger 33 will be shifted and the port 41 will almost close the passage 38. It will be apparent that the effect shown in Fig. 8, produced by acceleration of the movement of the valve while it was moving up an incline in the direction of the arrow 69, may also be produced by deceleration of the valve when it is moving down the same incline in a direction opposite arrow 69.

If the valve is decelerated while moving up an incline in the direction of the arrow 71, or, if it is accelerated while moving down the same incline opposite to the direction of the arrow 71, the hanger 43 and the pendulum 57 will be swung about their respective hinges 46 and 66 and the valve plunger 33 will shift and misalign the port 41 with the passage 38 as shown in Fig. 9.

While in the hereinbefore described embodiment of the invention I employ a plunger valve, it will be obvious that any movable valve operating member may be substituted for the plunger 33, whether such movable valve operating member operates upon a poppet valve, a butterfly valve, or a valve of any other type. The important feature of the invention consists in providing means to move such valve operating member, which means is operable by inertia only and not by a change in the plane of the valve body.

Having shown an embodiment of my invention in which the objects hereinbefore set forth are attained, I claim—

1. A pendulum valve comprising, a body having a fluid passage therethrough, a valve operating member movable in relation to said body for altering the capacity of said passage, a pendulum normally swingable about a hinge the axis of which passes through a movable part of the valve operating member transversely of the line of movement of the said valve operating member, a hanger also swingable about the said normal axis, and a hinge near the free end of the hanger providing a second axis for the said pendulum.

2. A pendulum valve comprising, a body having a fluid passage therethrough, a valve operating member movable in relation to said body for altering the capacity of said passage, a long stemmed pendulum normally swingable about a hinge fixed with respect to said body, the axis of said hinge passing transversely through the line of movement of a part of said valve operating member, a hanger also swingable about said normal hinge, and a second hinge means connecting the free end of the hanger to a point on the stem of the pendulum thereby providing a second hinge point for said long stemmed pendulum.

3. A pendulum valve comprising, a body having a fluid passage therethrough, a valve operating member movable in relation to said body for altering the capacity of said passage, a hinge fixed with respect to said body, the axis of said hinge passing transversely through the line of movement of a part of said valve operating member, a hanger swingable on said hinge, a second hinge carried by said hanger near its free end, a pendulum swingable on said second hinge, a part of the stem of said pendulum passing through the axis of the first said hinge, means connecting said part of said stem to said valve operating member, and means operative to be overcome by inertia urging the said part of said stem into alignment with the first said hinge.

4. The structure defined in claim 3 wherein the said urging means is a spring means.

5. A bodily movable pendulum valve comprising, a body having a fluid passage therethrough, a valve operating member movable in relation to said body for altering the capacity of said passage, hinge means fixed with respect to said body, the axis of said hinge passing transversely through the line of movement of a part of said valve operating member, a hanger swingable about said hinge, a second hinge means carried by said hanger near its free end, a pendulum swingable on said second hinge means, the stem of said pendulum passing through the line of movement of a part of the valve operating member, a third hinge means connecting the said stem to the said valve operating member at the said point where it passes through the said line of movement, and means operative to be overcome only by a change in the rate of movement of said body urging the first and the third hinge means to remain in coaxial alignment.

6. A bodily movable pendulum valve comprising, a body having a fluid passage therethrough, a valve operating member movable in relation to said body for altering the capacity of said passage, hinge means secured to said body, the axis of said hinge means passing transversely through the line of movement of a part of said valve operating member, a hanger swingable about said hinge means, a second hinge means carried by said hanger near its swingable end, a pendulum swingable on said second hinge means, the stem of said pendulum passing through the line of movement of a part of said valve operating member, a third hinge means connecting the said stem to the said valve operating member, the distance between the first and second hinge means being the same as the distance between the second and third hinge means, and means operative to be overcome by a change in the rate of movement of said body urging the first and third said hinge means to remain in coaxial alignment.

7. A bodily movable pendulum valve comprising, a body having a fluid passage therethrough, a valve operating member operative upon movement with respect to said body to restrict said fluid passage, hinge means carried by said body having an axis transversely to the movement of said valve operating member, a hanger swingable about said hinge means, a second hinge means carried by the swingable end of said hanger, a pendulum swingable about said second hinge means, a third hinge means carried by said pendulum at a distance from said second hinge means equal to the distance between the second and first hinge means, means connecting the said third hinge means to said valve operating member, means urging said first and third hinge means to remain in coaxial alignment, and means responsive to a change in the rate of bodily movement of said valve to overcome said urging means and move said hinge means out of said axial alignment and in the direction of movement of said valve operating means.

8. A pendulum valve, operative during bodily movement through space, comprising, a body having a fluid passage therethrough, a valve operating member movable with respect to said body to alter the size of said passage, a pendulum, a hinge means normally stationary with respect to said body but movable in the direction of movement of said valve operating member swingably connecting said pendulum to said valve operating member, a second hinge means carried on said body normally in coaxial alignment with said first hinge means, a hanger swingable on said second hinge means, a third hinge means joining the swingable end of said hanger to a point on said pendulum, means urging the said first and the said second hinge means to remain in coaxial alignment and means responsive to a change in the rate of the bodily movement of said valve to overcome said urging means.

9. The structure defined in claim 8 wherein a spring means is the urging means.

10. A valve operable during bodily movement through space by change in its rate of movement, comprising a valve member movable forwardly or backwardly of the direction of said bodily movement to alter the capacity of said valve, a hinge means fixed on said valve having an axis extending transversely of the movement of said valve member through a part of said valve member, a pendulum normally swingable about the axis of said hinge means and hingedly secured at said axis to said movable valve member, a hanger permanently swingable about said hinge means, means hingedly connecting said hanger and said pendulum at a point removed from said hinge means, and means urging said pendulum to maintain its normal axis, said pendulum being operative by change in the rate of said bodily movement to overcome said urging means.

11. An inertia operable valve comprising, a body, a plunger movable horizontally through said body, said body having a fluid passage and said plunger having a port transversely therethrough and normally in alignment with said fluid passage, a hinge having an axis passing transversely through the plunger axis, a hanger swingable on said hinge, a second hinge secured to the swingable end of said hanger, a pendulum swingable on the said second hinge, a third hinge normally coaxial with the first hinge swingably connecting said pendulum to said plunger, the first hinge being fixed to the said valve body and the said third hinge being movable with said plunger, and means urging the third hinge to remain in coaxial alignment with the first hinge, said pendulum being responsive to change in the rate of bodily movement of said valve when it is moving in the general direction of the axis of the said plunger to overcome said urging means and thereby move said plunger by moving the third hinge out of coaxial alignment with the first hinge.

12. An inertia operable valve comprising, a body having a normally horizontal opening and a fluid passage extending transversely through said opening, a plunger slidably fitted into said normally horizontal opening, said plunger having a vertical slot therethrough and a horizontal port normally in alignment with said passage to keep said valve open, a hinge fixed to said body having its axis passing transversely through the axis of said plunger within said vertical slot, a hanger swingable on said hinge, a second hinge carried on the swingable end of said hanger, a pendulum swingable on said second hinge and passing through said slot, and yieldable means urging said pendulum to maintain a fixed relation with respect to said hanger whereby it may swing only about the said first hinge, said pendulum being operative by change in the rate of bodily movement of said valve when it is moving in the general direction of the axis of the said plunger to overcome said yieldable means and cause said pendulum to swing on the said second hinge to thereby move the said plunger to close said valve.

13. In combination, a valve, a valve operating member movable to operate said valve, a body movably supporting said valve operating member, a pendulum normally swingable about a hinge the axis of which passes through a movable part of the valve operating member transversely of the line of movement of the said valve operating member, said hinge being fixed in position with respect to the said body, inertia controlled means for causing the pendulum to swing from a second axis parallel to but away from said normal axis, and means pivotally connecting said pendulum to said valve operating member at an axis which is normally coincident with said normal axis whereby swinging of said pendulum on its normal axis will not move said valve operating member, but swinging of said pendulum on its second axis will move said valve operating member.

14. In combination, a valve, a valve operating member movable to operate said valve, a body movably supporting said valve operating member, a pendulum normally swingable on a hinge having fixed position with respect to said body, the axis of said hinge passing transversely through the line of movement of said valve operating member, inertia controlled means carrying a second hinge for said pendulum spaced apart from and axially parallel to the first said hinge, said second hinge being movable with respect to said body, and means pivotally connecting said pendulum to said valve operating member at an axis which is normally coincident with said fixed hinge, whereby swinging of said pendulum about the said fixed hinge will not move said valve operating member, but swinging of said pendulum about the said movable hinge will move the said valve operating member.

15. In combination, a valve, a valve operating member movable to operate said valve, a body movably supporting said valve operating member, a hinge fixedly held in said body with its axis passing through a part of said valve operating member transversely of the line of movement of said valve operating member, a pendulum supporting member on said fixed hinge swingable thereon by sudden change in its rate of movement through space, a movable hinge carried by said supporting member away from but having its axis parallel to the axis of the said fixed hinge, a pendulum, means pivotally joining said pendulum to said valve operating member, and means normally holding the axis of the pivot coincident with the axis of the fixed hinge, said holding means being overcome by swinging of the said pendulum supporting member due to sudden change in its rate of movement through space.

16. In combination, a valve, a valve operating member movable to operate said valve, a body movably supporting said valve operating member, a hinge fixed in said body, the axis of said hinge passing through a part of said valve operating member transversely of the line of movement of said valve operating member, a pendulum supporting member swingable about said fixed hinge, a pendulum, hinge means for said pendulum carried on the swingable part of said supporting member, means pivotally securing said pendulum to said valve operating means, and means normally holding the axis of said pivot coincident with the axis of said fixed hinge but allowing movement to axially parallel positions by simultaneous movement of the pendulum and the supporting member in the same direction with respect to the said body.

17. In combination, a valve, a valve operating member movable to operate said valve, a body movably supporting said valve operating member, a hinge fixed in said body with its axis passing through the valve operating member transversely of the line of movement of the said valve operating member, a pendulum supporting member swingable about said fixed hinge, a pendulum having a weight portion and a stem, said stem being hingedly supported near its end on the swingable portion of the said supporting member, and means pivotally connecting the valve operating member to a point on said stem intermediate the weight portion and the end of the stem, means normally holding the axis of said pivot coincident with the axis of said fixed hinge but permitting movement to axially parallel positions by simultaneous movement of the pendulum and the supporting member in the same direction with respect to the said valve body.

18. In combination, a valve, a valve operating member movable to operate said valve, a body movably supporting said valve operating member, a hinge fixed in said body with its axis passing through the valve operating member transversely of the line of movement of the said valve operating member, a pendulum hanger comprising a weight mass and means vertically below the center of gravity of said weight mass swingably supporting it on the fixed hinge, a pendulum having a weight portion and a stem, said stem being hingedly supported at its end on the swingable portion of said hanger, means pivotally connecting a point on said stem intermediate the weight and the end of the stem to the valve operating member, and means yieldably holding the axis of the pivot and the axis of the fixed hinge coincident but movable to axially parallel positions by simultaneous movement of the weight mass of the hanger and the weight portion of the pendulum in the same direction with respect to said body.

FREDERICK W. COTTERMAN.